Dec. 31, 1957      H. J. GEDER      2,818,473
AUTOMATIC PROGRAM CONTROLLER
Filed April 22, 1955      2 Sheets-Sheet 1
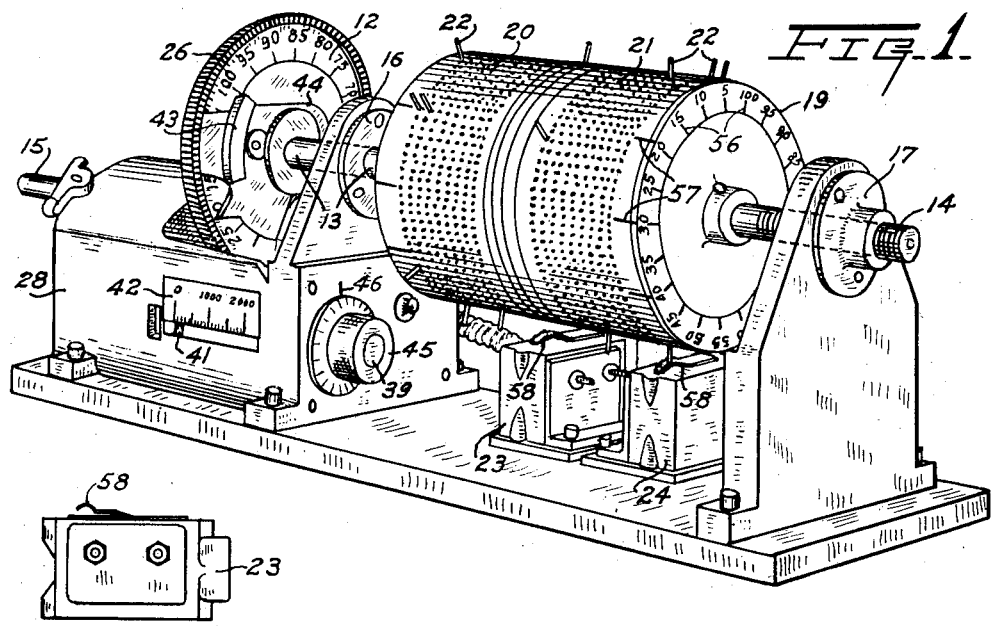
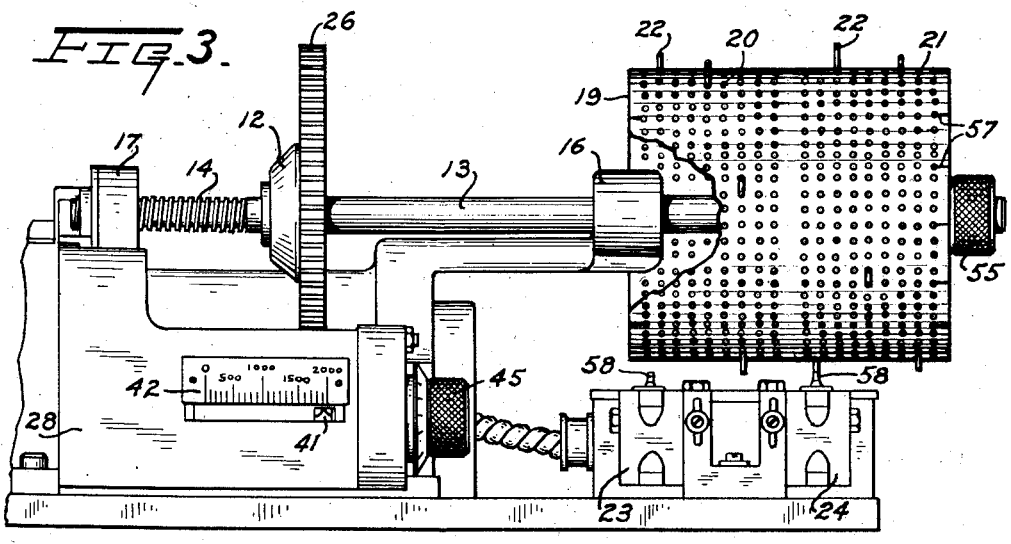
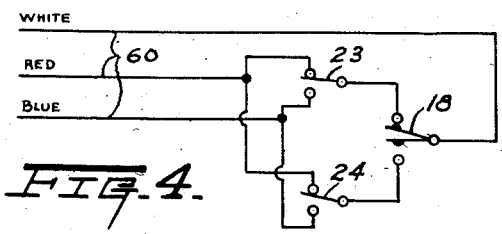
INVENTOR.
H. J. Geder
BY
Lieber & Lieber
ATTORNEYS Dec. 31, 1957  H. J. GEDER  2,818,473
AUTOMATIC PROGRAM CONTROLLER
Filed April 22, 1955  2 Sheets-Sheet 2
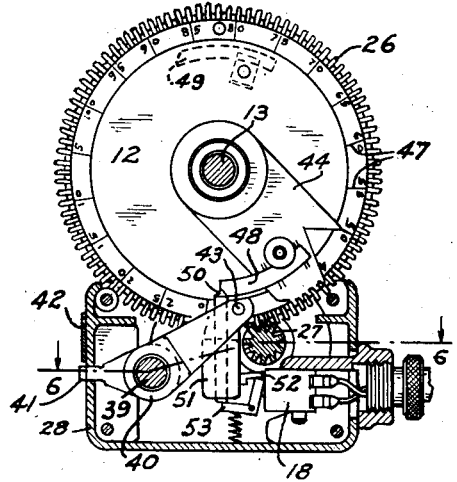
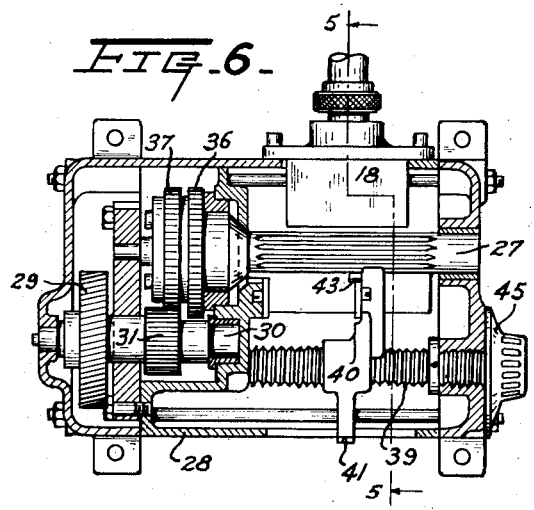
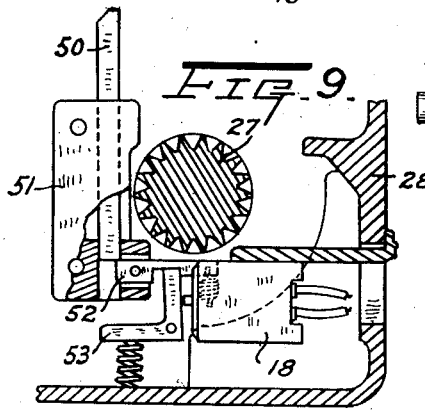
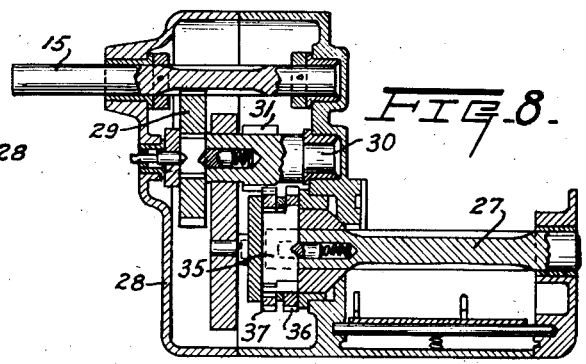
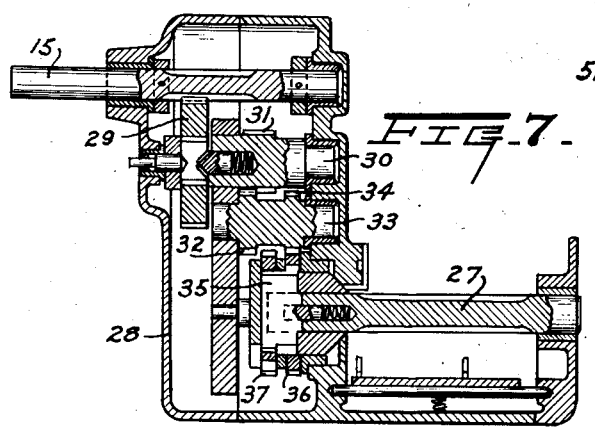
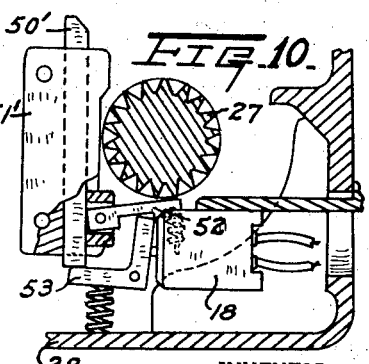
INVENTOR.
H. J. Geder
BY
Lieber & Lieber
ATTORNEYS.

United States Patent Office 2,818,473
Patented Dec. 31, 1957

2,818,473

AUTOMATIC PROGRAM CONTROLLER

Harold J. Geder, Wauwatosa, Wis., assignor to Counter and Control Corporation, Milwaukee, Wis., a corporation of Wisconsin Application April 22, 1955, Serial No. 503,306

4 Claims. (Cl. 200—38)

This invention relates in general to improvements in the art of controlling the functioning of diverse machines, systems, or processes for performing various classes of work or the like; and it relates more specifically to improved equipment especially cooperable with repeating cycle counting mechanism in a manner whereby the patterns of events or programs represented by such counters may be extensively varied to meet different operating conditions.

The primary object of the present invention is to provide improved instrumentalities cooperable with a counter for controlling the occurrence of certain events at predetermined intervals, so as to enable the counter to also control the occurrence of other events in accordance with preselected patterns within such predetermined intervals.

As shown and described in U. S. Patent No. 2,489,474, granted November 29, 1949, it has heretofore been proposed to provide mechanism for effecting automatic repetition of predetermined numbers of events with the aid of a rotary counting wheel or element which is axially movable in opposite directions between pre-set limits and co-operates with a clutch device to reverse the revolution and the axial movement of the element whenever it has travelled in either direction from one preset limit to the other. While this prior mechanism has proven highly satisfactory and successful in actual commercial use for diverse purposes, it does embody certain limitations especially when it becomes desirable to control the occurrence of events within the preset limits of axial movement of the counting wheel and according to preselected patterns.

It is therefore an important object of this invention to provide simple and efficient means adapted to coact with mechanism of the type above described so as to enable such mechanisms to automatically control the performance of events according to preselected patterns within the preset limits of reversal of the main counting element.

Another important object of the invention is to provide an improved automatic multi-stage controller especially adapted to make and break electric circuits at predetermined intervals and in accordance with preselected programs or patterns.

A further important object of the present invention is to provide an improved unit for effecting the performance of successive events according to a variety of patterns with utmost precision, and for automatically repeating the patterns for prolonged periods.

Still another important object of this invention is to provide a compact, durable and simple electric circuit controller cooperating with an automatically re-cycling counter for effecting accurate performance of controlled equipment in a highly flexible manner.

An additional important object of the invention is to provide a precision counter operable at high speed and through selected count cycles of great range, and which is reversible to repeat cycles of diverse magnitudes without losing any counts at any time.

These and other more specific objects and advantages of the present invention will be apparent from the following detailed description.

A clear conception of the specific features constituting the present improvement and of the construction and operation of a commercial automatic program controller embodying the invention, may be had by referring to the drawings accompanying and forming a part of this specification in which like reference characters designate the same or similar parts in the various views.

Fig. 1 is an end and side perspective view of an electric circuit controlling recycling counter embodying the present improvements, and wherein the counting wheel and the drum member are mounted upon a rotary shaft having thereon screw threads for moving these elements axially and which are located at the shaft end farthest from the wheel;

Fig. 2 is a fragmentary side view of a somewhat similar electric circuit controlling recycling counter unit, but having the screw threads which move the counting wheel and the drum member axially applied to the end of the shaft which carries these elements located nearest to the wheel;

Fig. 3 is a complete side view of one of the standard micro switches embodied in the units of Figs. 1 and 2 provided with a special narrow leaf spring actuator;

Fig. 4 is a simple electric wiring diagram of a typical installation embodying a unit such as shown in either Fig. 1 or Fig. 2;

Fig. 5 is a transverse vertical section through the automatic recycling counter, the section having been taken along the line 5—5 of Fig. 6;

Fig. 6 is a transverse horizontal section through the counting and control mechanism taken along the line 6—6 of Fig. 5, and showing the indicator disposed between its limits of possible adjustment;

Fig. 7 is a fragmentary developed section through the clutch assembly of the counting wheel actuating mechanism taken along an irregular line passing centrally through the main driving shaft and through the counting wheel propelling shaft, and showing the clutch in one extreme actuating position;

Fig. 8 is another fragmentary developed section similar to that of Fig. 7, but showing the clutch in its opposite extreme actuating position;

Fig. 9 is an enlarged fragmentary vertical section similar to that of Fig. 5 and showing the mechanical latching device which controls the selector switch of the unit in open position; and Fig. 10 is a similarly enlarged fragmentary vertical section of the mechanism illustrated in Fig. 9, but showing the selector switch in closed position.

While the invention has been shown and described herein as being advantageously applicable to automatically functioning units for controlling diverse machines with the aid of electric switches operable by an axially movable rotary counting wheel, it is not the intent to unnecessarily restrict the improvements to such usage. It is also contemplated that specific descriptive terms employed herein be given the broadest possible interpretation consistent with the actual disclosure; and although the term "counter" has been used herein to designate certain parts, the present mechanism is not a performance registering device but is in fact a unit for controlling the timing of the repetition of events or performances in accordance with preselected patterns or programs.

Referring to the drawings, the automatic program controller illustrated in Figs. 1 and 2, comprises in general a rotary counting or timing wheel 12 mounted coaxially upon and secured to a shaft 13 having screw threads 14 at one end thereof; a power or driving shaft 15 for rotating the shaft 13 and wheel 12; spaced bearings 16, 17 rotatably supporting the shaft 13, of which the bearing 17 is provided with internal screw threads coacting with the shaft threads 14 to cause the rotating wheel 12 to also move along the axis of the shaft 13; a double throw electric switch 18 operable by axial displacement of the wheel 12 between predetermined limits; a drum member 19 also mounted upon and secured to the shaft 13 and having thereon two helical formations 20, 21 each comprising a series of helically disposed holes forming helices of far greater diameter than the shaft 13 but of the same axial pitch as that of the shaft threads 14; pins 22 adapted to be inserted within selected holes of the formations 20, 21; and a pair of electric switches 23, 24 operable by pins 22 inserted within selected holes of the series 20, 21 respectively to control the performance of events within the limits of axial displacement of the wheel 12 as predetermined by setting of the switch 18.

The count timing wheel 12 is of similar construction and operation as the timing wheel of the device shown in Patent No. 2,489,474 hereinabove referred to, and the wheel 12 is provided with peripheral radially and laterally projecting teeth 26 normally meshing with and slidable along elongated teeth formed on a driven shaft 27 which is journalled for rotation within a housing 28 in which the power shaft 15 is also journalled, see Figs. 5 to 10 inclusive. This power or driving shaft 15 is rotatable in any desired manner either continuously or intermittently and at high or slow speed, and is provided within the housing 28 with elongated teeth which mesh with a clutch gear 29 secured to a clutch shaft 30 also journalled in bearings in the housing 28, as shown in Figs. 7 and 8. The medial portion of the clutch shaft 30 has relatively wide gear teeth 31 formed thereon which are engaged by peripheral teeth 32 formed near one end of a counter shaft 33 which is journalled within the housing 28 and has another series of gear teeth 34 formed thereon near its opposite end. The adjacent end of the driven shaft 27 is alternately drivingly connectable through an automatic reversing clutch 35 and a pair of ring gears 36, 37 with the teeth 34 of the counter shaft 33 as in Fig. 7, and with the wide teeth 31 of the clutch shaft 30 as in Fig. 8, in order to reverse the direction of rotation of the shaft 27 and of the count timing wheel 12 at predetermined intervals.

Mounted upon a screw 39 rotatably supported within the housing 28 is an indicator 40 having a pointer 41 cooperable with a gage plate 42, and also having an extension provided with a contact block 43 cooperable with one side of a flexible pointer plate 44 rotatably adjustable about a side face of the wheel 12. The indicator hub is provided with internal screw threads which coact with the threads of the screw 39 and the outer end of this screw 39 is provided with a calibrated adjusting knob 45 coacting with a setting mark 46, so that rotation of the screw 39 with the aid of the knob 45 will locate the contact block 43 at various positions along the path of axial displacement of the timing wheel 12. The pointer plate 44 is adjustably cooperable with calibrations 47 on the adjacent face of the wheel 12, and the plate 44 also carries an arcuate cam abutment 48 which is adjustable about the wheel axis with the pointer plate, while the opposite face of the wheel 12 is provided with another arcuate cam abutment 49, as depicted in Fig. 5. These cam abutments 48, 49 are alternately cooperable with push rods 50, 50' slidably confined within bearing blocks 51, 51' mounted in the housing 28, to actuate the double throw switch 18 through a holding latch 52 and a spring pressed bell crank 53, as illustrated in Figs. 9 and 10, and by actuating the adjusting knob 45 and screw 39 the indicator 40 may be preset to cause the reversely travelling wheel 12 to actuate the switch 18 whenever a predetermined number of counts have been completed.

In both of the embodiments shown in Figs. 1 and 2, the timing wheel 12 and the drum member 19 are firmly secured to and are simultaneously rotatable with the shaft 13, and in both cases the end screw threads 14 of this shaft coact with the internal screw threads of a fixed bearing 17, so that when the wheel 12 is rotated in opposite directions upon reaching its predetermined limits of axial movement, and its direction of rotation is reversed by the clutch mechanism 35, the direction of rotation and of advancement of the drum member 19 will also be reversed. The primary difference between the two modifications is that in Fig. 2 the drum member 19 is detachably secured to the adjacent end portion of the shaft 13 by a nut 55 and an internal releasable drive. The pin receiving holes constituting the two helical series 20, 21 at the drum periphery must be accurately disposed in parallel rows separated by degrees as indicated by radial calibrations 56 at each of the opposite ends of the drum and by peripheral marks 57 at the opposite ends of the peripheral surface of the member 19. The pattern designating pins 22 must also be formed to snugly coact with the holes of the helical series 20, 21 but must be readily insertible and removable, and the helices defined by the two series of holes 20, 21 must have the same axial pitch as that of the screw threads 14 so that the pins 22 will travel axially of the shaft 13 to the same extent as the wheel 12 travels during the simultaneous axial movement of the wheel 12 and drum member 19. The helices formed by the hole series 20, 21 are identical and the revolving pins 22 applied to the holes, will contact the actuating levers 58 of the micro-switches 23, 24 to close or open same in accordance with preselected patterns or programs within the predetermined limits of axial displacement of the timing wheel 12.

When the improved automatic program controller has been accurately constructed, assembled and adjusted as above described, and the driving shaft 15 has been connected to a suitable source of power, the switches 18, 23, 24 should be connected to an electric power line 60 as illustrated in the simple wiring diagram of Fig. 4. The predetermined count cycle which represents the total number of counts required to complete a desired switching pattern or program, that is, the number of counts involved in the entire axial advancement of the timing wheel 13 in either direction for any desired relative setting of the limit stops or revolving cam plates 48, 49, should then be accurately fixed by turning the knob 45 and the screw 39 so as to properly locate the indicator 40 relative to the calibrated plate 42. The calibrated knob 45 serves as a micrometer when making this limit travel adjustment of the wheel 12, and the count cycle may be set for any number of counts from 0 to 2000. After this limit setting has been effected, the calibrations 56 and the peripheral markings 57 at the opposite ends of the perforated drum 19 may be utilized to apply pins 22 to any of the multiplicity of holes in the drum in order to cause these pins 22 to actuate the micro-switches 23, 24 at precise moments so as to accurately throw these switches in a manner whereby preselected patterns or programs of events controlled by the individual switches 23, 24 will result within each limit of travel of the wheel 12 in either direction.

The switches 23, 24 may be adjusted so that the closing or opening thereof by the revolving pins 22 is only momentary or for relatively long periods of time, and the patterns produced by applying pins 22 to the holes in the two helical series 20, 21, may be identical or different. When this application of the pins 22 to both series 20, 21 is identical, the pattern will be the same for each repetition of the cycle of the timing wheel 12; but if the pins 22 are applied to produce different patterns then the latter will be reproduced only during alternate complete cycles of the wheel 12. The successive cycles of the numeral or counting wheel 12 will be repeated indefinitely as long as power is applied to the driving shaft 15, and the double-throw switch 18 is automatically actuated to move from one position to the other whenever the predetermined number of counts has been effected in either direction so as to alternately actuate the switches 23, 24. The improved units may be operated either by constantly rotating power or the like to count revolutions, or by an oscillating lever to count strokes, or by a reciprocating solenoid to count electric impulses, or by any other means to count events of diverse character, thus making it possible to utilize the devices for automatically controlling various machines and processes with utmost flexibility.

From the foregoing detailed description it will be apparent that the present invention in fact provides an automatically functioning device for controlling the timing of the performance and repetition of events in accordance with preselected patterns or programs and with utmost precision. The pattern controlling drum member 19 may be provided with any type of peripheral helical formation other than the series 20, 21 of holes and the cooperating pins 22, but it is essential that the helical switch actuating formation have the same axial pitch as that of the screw threads 14 which move the wheel 12 and the drum member 19 axially. The adjustment of the limits of travel of the timing wheel 12 may be readily and accurately effected with the aid of the micrometer knob 45 and pointer plate 44, and the pins 22 may also be conveniently applied to the helical series 20, 21 of holes in the member 19 so as to produce the exact patterns of events desired within the predetermined limits of travel of the wheel 12 as fixed by the setting of the indicator 40. The improved program controlling mechanism has proven highly satisfactory and successful in actual commercial use for diverse purposes especially when associated with a count timing device such as disclosed in the prior patent herein referred to, but it may also be utilized in conjunction with other devices for regulating and repeating the desired count cycles.

It should be understood that it is not desired to limit this invention to the exact details of construction and to the precise mode of utilizing the automatic program controller, specifically shown and described herein, for various modifications within the scope of the appended claims may occur to persons skilled in the art.

I claim:

1. An automatic program controller comprising, a stationary support having internal screw threads therein, a shaft mounted for rotation in said support and having external screw threads coacting with said internal support threads, a timing wheel fixedly secured to said shaft, a drum member also fixedly secured to said shaft and having thereon a peripheral helical formation of greater diameter but of the same pitch as that of said screw threads, means for rotating said wheel to simultaneously rotate said shaft and said member as a unit and to thereby cause said coacting threads to bodily move the unit along the axis of said shaft, adjustable means coacting with said wheel for reversing the rotation and the direction of movement of and for varying the limits of said axial movement of the unit, and means operable by said helical drum formation for controlling the production of diverse patterns of preselected events within said limits of axial movement of the timing wheel as fixed by said limit adjusting means.

2. An automatic program controller comprising, a stationary support having internal screw threads therein, a shaft mounted for rotation in said support and having external screw threads coacting with said internal support threads, a timing wheel fixedly secured to said shaft, a drum member also fixedly secured to said shaft and having thereon a peripheral helical series of perforations forming a helix of greater diameter but of the same pitch as that of said screw threads, means for rotating said wheel to simultaneously rotate said shaft and said member as a unit and to thereby cause said coacting threads to bodily move the unit along the axis of said shaft, adjustable means coacting with said wheel for reversing the rotation and the direction of movement of and for varying the limits of said axial movement of the unit, pins insertible in preselected perforations of said series, and means operable by said pins for controlling the production of diverse patterns of preselected events within said limits of axial movement of the timing wheel as fixed by said limit adjusting means.

3. An automatic program controller comprising, a stationary support having internal screw threads therein, a shaft mounted for rotation in said support and having external screw threads coacting with said internal support threads, a timing wheel fixedly secured to said shaft, a drum member also fixedly secured to said shaft and having thereon several reversely progressing helical series of perforations forming right and left hand helices of greater diameter but of the same pitch as that of said screw threads, means for rotating said wheel to simultaneously rotate said shaft and said member as a unit and to thereby cause said coacting screw threads to bodily move the unit along the axis of said shaft, adjustable means coacting with said wheel for reversing the rotation and the direction of movement of and for varying the limits of said axial movement of the unit, pins insertible within selected perforations of both of said series, and switches operable by said pins for controlling the production of diverse patterns of preselected events within said limits of axial movement of the timing wheel as fixed by said limit adjusting means.

4. An automatic program controller comprising, a stationary support having internal screw threads therein, a shaft mounted for rotation in said support and having external screw threads coacting with said internal support threads, a timing wheel fixedly secured to said shaft, a drum member also fixedly secured to said shaft and having thereon several independent helical formations providing oppositely progressing helices of greater diameter but of the same pitch as that of said screw threads, means for rotating said wheel to simultaneously rotate said shaft and said member as a unit and to thereby cause said coacting threads to bodily move the unit along the axis of said shaft, adjustable means coacting with said wheel for reversing the rotation and the direction of movement and for varying the limits of axial movement of the unit in opposite directions, and means operable by said helical formations for effecting automatic repetition of the production of diverse patterns of preselected events within said limits of movement of the timing wheel as predetermined by said limit varying means.

References Cited in the file of this patent
UNITED STATES PATENTS

| 1,242,260 | Stone | Oct. 9, 1917 |
| 2,489,474 | Andren | Nov. 29, 1949 |